United States Patent [19]

Prust et al.

[11] E Re. 29,827

[45] Reissued Nov. 7, 1978

[54] COMPOSITIONS AND PROCESSES FOR PRODUCING CHROMIUM CONVERSION COATINGS ON SURFACES OF ZINC OR CADMIUM

[75] Inventors: Michael W. Prust, Grimsby; Wayne C. Glassman, Willowdale, both of Canada

[73] Assignee: Dominion Foundries and Steel, Limited, Hamilton, Canada

[21] Appl. No.: 737,791

[22] Filed: Nov. 1, 1976

Related U.S. Patent Documents

Reissue of:

[64] Patent No.: 3,857,739
Issued: Dec. 31, 1974
Appl. No.: 285,314
Filed: Aug. 31, 1972

[51] Int. Cl.[2] ..... C23F 7/26
[52] U.S. Cl. ..... 148/6.2; 106/14.21
[58] Field of Search ..... 148/6.2, 6.16; 106/14

[56] References Cited

U.S. PATENT DOCUMENTS

| | | | |
|---|---|---|---|
| 2,106,227 | 1/1938 | Scharschu | 148/6.2 |
| 2,786,002 | 3/1957 | Van et al. | 148/6.2 |
| 3,116,176 | 12/1963 | Fuchs | 148/6.2 |
| 3,287,179 | 11/1966 | Frank | 148/6.2 |
| 3,331,710 | 7/1967 | Lodeesen et al. | 148/6.2 |
| 3,481,797 | 12/1969 | Leland | 148/6.16 |
| 3,553,034 | 1/1971 | Harvey et al. | 148/6.2 |
| 3,620,777 | 11/1971 | Okabe | 148/6.2 |
| 3,660,172 | 5/1972 | Otto | 148/6.2 |
| 3,706,604 | 12/1972 | Plaxton | 148/6.16 |
| 3,752,707 | 8/1973 | Laird et al. | 148/6.2 |
| 3,857,739 | 12/1974 | Prust et al. | 148/6.2 |

OTHER PUBLICATIONS

Merck Index, 7th Edition, pp. 785, 533, 1960.

*Primary Examiner*—John T. Goolkasian
*Attorney, Agent, or Firm*—Hirons & Rodgers

[57] ABSTRACT

In a process for producing a chromium protective coating on a zinc or cadmium surface the surface has applied thereto an aqueous composition including chromium, perchlorate and fluoride ions with the chromium ion being the only metal ion present before application to the surface. The apparatus by which the composition is applied to a strip moving through an application station includes a provision for rinsing the surface if the strip is stopped for longer than a predetermined time in the station.

13 Claims, 1 Drawing Figure

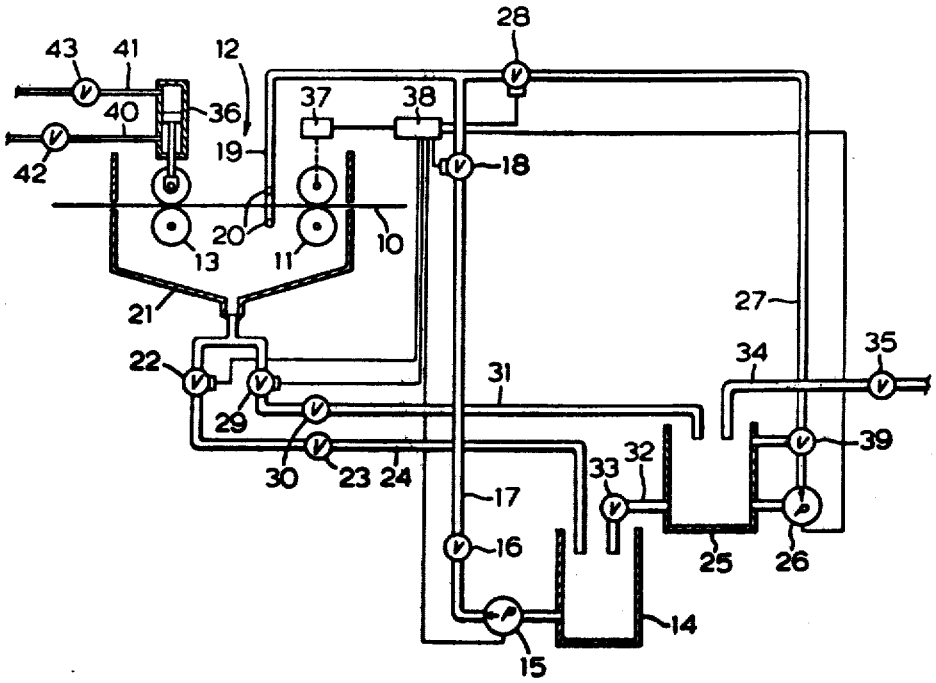
28
43
41
12
37
38
40
36
42
19
18
20
10
13
11
21
27
22
34
35
31
29
39
30
23
24
33
32
17
16
25
26
14
15

COMPOSITIONS AND PROCESSES FOR PRODUCING CHROMIUM CONVERSION COATINGS ON SURFACES OF ZINC OR CADMIUM

Matter enclosed in heavy brackets [ ] appears in the original patent but forms no part of this reissue specification; matter printed in italics indicates the additions made by reissue.

FIELD OF THE INVENTION

This invention is concerned with improvements in or relating to compositions and processes for producing chromium conversion coatings on surfaces of zinc or cadmium.

REVIEW OF THE PRIOR ART

A continuing problem exists in the field of protective coatings of zinc and cadmium applied to a substrate, such as a steel strip or article, to protect is against corrosion. The zinc or cadmium protective coating itself will corrode in time to give a white or whitish deposit commonly known as "storage stain" or "white rust." It is common therefore to apply a thin protective coating to the zinc or cadmium surface which usually consists of a chromium compound of compounds and is known as a "conversion" coating.

The conversion coating usually is formed by applying a suitable aqueous solution containing chromium to the zinc or cadmium surface, the solution reacting with the surface to form a thin gel-like film of complex chromates. The film is substantially non-porous to moisture, and also is non-crystalline, so that it provides a good paint bond without absorption of the paint onto the surface. Examples of processes for producing such a coating are given in U.S. Pat. Ser. No. 3,457,124, issued July 22nd, 1969 to Cowles Chemical Company, the solution including specified amounts selected from sodium diachromate, chromic acid, sulfamic acid, ammonium sulphate, boric acid, sodium silicofluoride and nitric acid.

SUMMARY OF THE INVENTION

It is the principal object of the present invention to provide a new composition for use in the production of a protective coating on zinc or cadmium, and a new process making use of such a composition.

In accordance with the present invention there is provided a composition for producing a chromate protective coating on a surface comprising zinc or cadmium, the composition *having a pH less than 1.15 and* consisting of [an aqueous solution of pH less than 1.15 containing] *demineralised water,* a source of chromium ion, *the chromium ion being present in the amount of 5 - 15 grams per liter, chromium being the only metallic ion present,* a source of perchlorate ion, the perchlorate ion being present in the amount [of 0.5 to 0.85 grams] *corresponding to from 0.3 to 0.5 ml of 60% perchloric acid* per liter, and a source of fluoride ion, the fluoride ion being present in the amount [of 0.1 to 0.27 grams] *corresponding to from 0.1 to 0.25 ml of 48% hydrofluoric acid* per liter. [Preferably, the] *The* chromium ion is the only metallic ion present therein [(] other than impurities normally present in the technical grade materials used [)].

The pH of the solution may be in the range 1.15 to 0.85, and preferably is in the range 1.0 to 0.9. The chromium ion may be present in the amount of 5 to 15 grams per liter, corresponding to the addition of 10 to 30 grams per liter anhydrous chromium trioxide to the solution, and preferably is present in the amount of 9 to 13 grams of ion per liter. [The amount of perchlorate ion present corresponds to the addition of 0.3 to 0.5 ml of 60 percent perchloric acid to each liter of the solution, while the amount of fluoride ion present corresponds to the addition of about 0.1 to 0.25 ml per liter of 48 percent hydrofluoric acid to the solution. Preferably the fluoride ion is present in the amount of 0.15 to 0.27 grams per liter.]

A process in accordance with the present invention includes applying a composition as specified in the preceding two paragraphs to a zinc or cadmium surface for a period of from 1 to 10 seconds at a temperature of from 150° F to 200° F.

DESCRIPTION OF THE DRAWING

The accompanying drawing in a schematic diagram of an apparatus for carrying out a typical process of the invention making use of compositions in accordance with the invention.

DESCRIPTION OF THE PREFERRED EMBODIMENTS

The invention is described as applied to the production of a chromium protective coating on the surfaces of galvanised steel strip, indicated in the drawing by the reference 10. As illustrated schematically by the drawing the strip is passed by rolls 11 to a liquid application station indicated by 12, and passes from the station via a pair of squeeze or pressure rolls 13 to further stages of the apparatus in which it is dried and coiled. The arrangement of these further stages will be apparent to those skilled in the art and therefore further description is not required for a complete description of the invention.

An aqueous solution comprising a composition in accordance with the invention is stored in a tank 14 and fed from there via pump 15, valve 16, pipe 17, automatically controlled valve 18 and header 19 to two sets of spray nozzles 20, which are disposed above and below the strip and direct sprays of the liquid on to the surfaces thereof. Excess liquid that runs from the strip is collected by a catch baisin 21 and returned to the tank 14 via automatically controlled valve 22, valve 23 and pipe 24.

A second tank 25 at a higher level than tank 14 contains rinse water which can be fed when required to the spray nozzles 20 via pump 26, pipe 27 and automatically controlled valve 28. As with the coating producing composition, the rinse liquid draining from the strip is received by the catch baisin 21 and returned to the tank 25 via an automatically controlled valve 29, valve 30 and pipe 31. The tank 14 is heated and maintained at the required elevated temperature by any convenient means, which are not illustrated, and the tanks 14 and 25 are connected by a pipe 32 and valve 33 to permit the contents of tank 25 to be used as make-up water for the liquid in tank 14 when needed. The contents of tank 25 (the temperature of which may also be controlled if required) are replenished when required from any suitable source of demineralized water via a pipe 34 including valve 35.

In operation of the apparatus the strip 10 unwinding from its supply reel passes at substantially constant speed through the station where it is sprayed with liquid from the tank 14. Excess liquid is removed from the strip, and some control of the thickness of the resultant protective coating is provided by the pressure rollers 13, which are pressed into contact with one another at a predetermined pressure by air-operated motors 36. The speed of movement of the strip, and the distance between the nozzles 20 and the rollers 13, is made such as to give the desired effective immersion time of the strip in the liquid, which typically will be a period of from 1 to 10 seconds.

The fact that the strip is moving, and perhaps also the speed at which it is moving through the station 12, is determined by any suitable detector which, in this embodiment, is illustrated as a detector 37 coupled to the rolls 13. The detector controls relay 38 which in turn controls the operation of the valves 18, 22, 28 and 29 and of the pumps 15 and 26. Under normal conditions of operation the relay 38 is operative to maintain the valves 18 and 22 open, the valves 28 and 29 closed, the pump 15 fully operative, and the pump 26 inoperative, or perhaps idling with the pressure relieved by a relief valve 39. Upon the detector 37 sensing that the speed of the strip has dropped below a predetermined value, the relay 38 is operative to close the valves 18 and 22 and stop the pump 15, cutting off the supply of the liquid from the tank 14. After a short variable period of time the valves 28 and 29 are opened and the pump 26 operated to supply rinse water to the nozzles 20 and rinse the liquid from the strip, thereby preventing excessive exposure of that part of the strip to the effect of the liquid, which usually will render it unfit for commercial useage because of discolouration. Normal operation will be resumed when the strip again is moving at above the minimum speed. The length of the above-mentioned period is such as to permit normal short stoppage of the line without operation of the rinse apparatus.

Other control systems for obtaining an equivalent operation will be apparent to those skilled in the art from the explanation above of one suitable scheme of such operation.

The control of the pressure applied to the strip by the rollers 13 is found to be important in obtaining the desired results, and will be discussed in detail below. It is found necessary in practice to change the rolls relatively frequently as they become worn and to re-work them to the required profile, while will change the weight of the rolls thus altering the pressure control characteristic. This effect is avoided in apparatus in accordance with the invention by providing that the pressure motors 36 are double-acting cylinders, the upper and lower parts of the cylinder being fed independently with compressed air from pipes 40 and 41 including valves 42 and 43 respectively. Thus, when a new set of rolls has been installed, air is supplied from pipe 40 to the lower part of the cylinder until the weight of the upper roller is just fully supported; the required air pressure is now established in the upper part of the cylinder and will determine the squeezing effect of the rollers independently of the weight thereof.

As explained above in the brief discussion of the prior art numerous attempts have been made in the past to apply to a zinc or cadmium surface a chromium "conversion" or passivation film to provide protection against white rust or storage stain. Such films or coatings are also found to increase the paintability of the resulting surface. The exact composition of these films is not known, beyond the fact that they are complex chromate compounds incorporating metal ions of the surface to which they applied. Spectrophotometric anaylsis shows that the chromium is present in both a water soluble hexavalent form and an insoluble trivalent form. In coatings produced by the processes and compositions of the present invention there is a surprising constancy in the ratio of the two forms of chromium, which will be discussed below.

It is believed at the present time that the essential constituents of the aqueous coating composition of the present invention are a source of chromium ion, a source of perchlorate ion, and a source of fluoride ion, the chromium ion being the only metallic ion present therein. For the purposes of this definition ammonium and like complex ions (e.g. $H^+$ is not a complex ion) that acts as metallic ions are regarded as metallic ions. The pH value of the solution is made less than 1.15 and preferably is in the range of 0.9 to 1.0, with a preferred minimum of 0.8.

It is believed that the absence of other metallic ions from the composition is a principal reason for the observed reduced sludge formation in the system. Another reason for lessened production of sludge is believed to be that the composition does not contain a buffering agent or agents, the most common of which are usually solid materials with a tendency to form insoluble compounds that will settle as sludge. The avoidance of sludge deposits is of course important in a commercial system to avoid the need for elaborate filter arrangements and to prevent blocking of the pipes by sludge particles, etc.

Owing to the high reactivity of the composition there is a tendency for metallic ions to enter the system if the pipes, tanks, etc. are of materials that are attached and precautions should be taken against this, as will be apparent to those skilled in the art. Another possible source of undesired extraneous metallic ions is the water used in the preparation and make-up of the aqueous solution and demineralised water should be used. The demineralisation should be such that the water has a resistance of more than 100,000 ohms.

The chromium ion is supplied to the solution most conveniently in the form of anhydrous chromium trioxide, in which the chromium is in hexavalent form. This compound can constitute a convenient medium for specifying the required concentration of chromium in the solution, which should be present as ion in the amount of 5 to 15 grams per liter, preferably 9 to 13 grams per liter. The corresponding quantities of the trioxide to be added are 10 to 30 grams per liter, preferably 18 to 25 grams per liter. The calculation of any other suitable material added to the solution will be apparent to those skilled in the art.

The perchlorate [is] *may be* added in the form of *the* 60 percent perchloric acid to provide the required amount of ion [of 0.5 to 0.85 grams per liter, and for this concentration the solution should contain], *requiring the specified amount of* from 0.3 to 0.5 ml per liter of the said 60 percent perchloric acid. The fluoride ion conveniently is added as *the* 48 percent hydrofluoric acid [to provide from 0.1 to 0.27 grams per liter of the fluoride ion, preferably 0.15 to 0.27 grams per liter, and this amount of ion requires], *requiring* the addition of *the specified amount of* about 0.1 to 0.25 ml per liter of the acid, preferably 0.15 to 0.25 ml per liter.

The usable operating temperature range for the solution is 150° F to 200° F, while the preferred temperature range is 170° F to 190° F. With the high reactivity the time of application is of the order of 1 to 10 seconds only, and the provision for rinsing described above is made operative if the exposure time increases to above fifteen seconds. An excessive exposure time is indicated by brown discolouration and even etching of the zinc surface.

The exact mechanism for the formation of the chromate film is not known to the applicants at this time, and accordingly the invention disclosed and claimed herein is not to be limited by any mechanism which is postulated at this time. The composition solution in contact with the zinc or cadmium surface generates hydrogen which is believed to reduce some of the hexavalent chromium to trivalent chromium, some of which may then be oxidised by the perchlorate ion back to the hexavalent state to balance the relative concentrations in the solution. The balance of the trivalent chromium goes into film formation on the zinc or cadmium surface. The trivalent chromium is believed more effective than the hexavalent form in combining with the fluoride ion, with which it complexes readily during film formation.

As will be appreciated from the small exposure times required the reaction involved takes place extremely rapidly and it appears to be a characteristic of films produced in accordance with this invention that the ratio of trivalent to hexavalent chromium therein always is about 2:1. However, excellent performance has been achieved with film weights outside this ratio, so that some form of balanced mechanism appears to be operative, whereas no consistent ratio is obtained with prior processes known to the applicants.

An examination of typical films produced shows trivalent chromium in the amount of from about 5 to about 12 micrograms per sq. inch (m.s.i) while the hexavalent form is present in the amount of from about 2 to about 7 m.s.i, giving a total chromium content of from about 7 to about 19 m.s.i., most usually in the neighbourhood of about 16 m.s.i. This thickness may be compared to the usual thickness of about 9 m.s.i. obtained with known systems. Excellent results have also been achieved with film weight outside these values.

The films produced by the application of the invention are found to be unexpectedly much more protective than those of known prior methods. One test known as the humidity cabinet test involves the use of a Cleveland condensation tester cabinet having its interior maintained at 100° F, wherein strips of galvanized steel are suspended above a water trough, the side exposed to the trough being at the said temperature of 100° F, while the other side is at the ambient temperature, usually about 70° F. The humidity of the cabinet interior is 100 percent and the water that condenses on the inner surface trickles back into the trough, giving the effect of a constant exposure to a rainy atmosphere. The strips are maintained under this condition until visual inspection shows that about 10 percent of the zinc coating has corroded to white rust. With the prior coatings known to the applicants an average exposure of 30 hours was sufficient to produce the specified corrosion, while this degree of attack is only obtained with the processes etc. of this invention after an exposure of about 400 - 1,000 hours.

In another test known as the salt fog test (A.S.T.M. No: B117-62) the strips are sprayed with a fine spray of 5 percent salt solution at 100° F. With known prior art films an exposure of about 10 hours was sufficient to produce the specified degree of corrosion, while strips treated in accordance with this invention only showed such attack after about 100 hours. It is known that a mere increase in thickness of the film does not necessarily increase the protection afforded thereby, and these improved results indicate that the films obtained are not only thicker, but also are more impervious to penetration by water vapour etc. It is known that the hexavalent chromium is considerably more mobile in the film forming complexes than the tivalent form, in addition to being more soluble, and does operate to provide a "sealing" mechanism whereby the mobile hexavalent ion migrates to potential "holes" in the film and reacts readily with the zinc to close such holes. However, it is the trivalent form complexed with the zinc and the fluorine that provides the essential protective film. The excess solution removed by the pressure rolls has the chromium predominantly in the hexavalent form because of its higher solubility and concentration.

Although the invention has been described as applied to the protection of zinc surfaces, it can also be applied to the corresponding protection of zinc alloy surfaces exhibiting the necessary reactivity toward the compositions, and to the protection of cadmium surfaces.

We claim:

1. A composition for producing a chromate protective coating on a surface comprising zinc or cadmium the composition *having a pH less than 1.15 and* consisting of [an aqueous solution of pH less than 1.15 containing] *demineralised water,* a source of chromium ion, *chromium being the only metallic ion present,* the chromium ion being present in the amount of 5–15 grams per liter, a source of perchlorate ion, the perchlorate ion being present in the amount [of 0.5 to 0.85 grams per liter] *corresponding to from 0.3 to 0.5 ml of 60 percent perchloric acid per liter,* and a source of fluoride ion, the fluoride ion being present in the amount [of 0.1 to 0.27 grams] *corresponding to from 0.1 to 0.25 ml of 48 percent hydrofluoric acid* per liter.

2. A composition as claimed in claim 1, wherein the pH of the solution is in the range 1.15 to 0.85.

3. A composition as claimed in claim 2, wherein the pH of the solution is in the range 1.0 to 0.9.

4. A composition as claimed in claim 1, wherein the chromium ion is present in the amount of 9 to 13 grams per liter.

5. A composition as claimed in claim 1, wherein the fluoride ion is present in the amount [of 0.15 to 0.27 grams] *corresponding to from 0.15 to 0.25 ml of 48 percent hydrofluoric acid* per liter.

6. A composition as claimed in claim 1, wherein the pH of the solution is in the range 1.15 to 0.85, wherein the chromium ion is present in the amount of 5 to 15 grams per liter, wherein the perchlorate ion is present in the amount [of 0.5 to 0.85 grams] *corresponding to from 0.3 to 0.5 ml of 60 percent perchloric acid* per liter, and wherein the fluoride ion is present in the amount [of 0.1 to 0.27 grams] *corresponding to from 0.1 to 0.25 ml of 48 percent hydrofluoric acid* per liter.

7. A composition as claimed in claim 1, wherein the pH of the solution is in the range 1.0 to 0.9, wherein the chromium ion is present in the amount of 9 to 13 grams per liter, wherein the perchlorate ion is present in the amount [of 0.5 to 0.85 grams] *corresponding to from 0.3 to 0.5 ml of 60 percent perchloric acid* per liter and wherein the fluoride ion is present in the amount [of 0.15 to 0.27 grams] *corresponding to from 0.15 to 0.25 ml of 48 percent hydrofluoric acid* per liter.

8. A process for producing a conversion coating on a metal surface comprising zinc or cadmium, including applying to the surface for a period of from 1 to 10 seconds at a temperature of from 150° F to 200° F a composition *having a pH in the range 1.0 to 0.9 and* consisting of [an aqueous solution of pH in the range 1.0 to 0.9 containing] *demineralised water,* a source of chromium ion, the chromium ion being present in the amount of 5–15 grams per liter, *chromium being the only metallic ion present,* a source of perchlorate ion, the perchlorate ion being present in the amount [of 0.5 to 0.85 grams] *corresponding to from 0.3 to 0.5 ml of 60 percent perchloric acid* per liter, and a source of fluoride ion, the fluoride ion being present in the amount [of 0.1 to 0.27 grams] *corresponding to from 0.1 to 0.25 ml of 48 percent hydrofluoric acid* per liter.

9. A process for producing a conversion coating on a metal surface comprising zinc or cadmium, including applying to the surface for a period of from 1 to 10 seconds at a temperature of from 105° F to 200° F a composition [containing an aqueous solution of pH less than 1.15 containing] *having a pH less than 1.15 and consisting of demineralised water,* a source of chromium ion, the chromium ion being present in the amount of 5 to 15 grams per liter, *chromium being the only metallic ion present,* a source of perchlorate ion, the perchlorate ion being present in the amount [of 0.5 to 0.85 grams] *corresponding to from 0.3 to 0.5 ml of 60 percent perchloric acid* per liter, and a source of fluoride ion, the fluoride ion being present in the amount [of 0.1 to 0.27 grams] *corresponding to from 0.1 to 0.25 ml of 48 percent hydrofluoric acid* per liter.

10. A process for producing a conversion coating on a metal surface comprising zinc or cadmium, including applying to the surface for a period of from 1 to 10 seconds at a temperature of from 105° F to 200° F a composition *having a pH less than 1.15 and* consisting of [an aqueous solution of pH less than 1.15 containing] *demineralised water,* a source of chromium ion, the chromium ion being present in the amount of 9 to 13 grams per liter, *chromium being the only metallic ion present,* a source of perchlorate ion, the perchlorate ion being present in the amount [of 0.5 to 0.85 grams] *corresponding to from 0.3 to 0.5 ml of 60 percent perchloric acid* per liter, and a source of fluoride ion, the fluoride ion being present in the amount [of 0.1 to 0.27 grams] *corresponding to from 0.1 to 0.25 ml of 48 percent hydrofluoric acid* per liter.

11. A process for producing a conversion coating on a metal surface comprising zinc or cadmium, including applying to the surface for a period of from 1 to 10 seconds at a temperature of from 105° F to 200° F a composition *having a pH less than 1.15* consisting of [an aqueous solution of pH less than 1.15 containing] *demineralised water,* a source of chromium ion, the chromium ion being present in the amount of 5–15 grams per liter, *chromium being the only metallic ion present,* a source of perchlorate ion, the perchlorate ion being present in the amount [of 0.5 to 0.85 grams] *corresponding to from 0.3 to 0.5 ml of 60 percent perchloric acid* per liter, and a source of fluoride ion, the fluoride ion being present in the amount [of 0.15 to 0.27 grams] *corresponding to from 0.15 to 0.25 ml of 48 percent hydrofluoric acid* per liter.

12. A process for producing a conversion coating on a metal surface comprising zinc or cadmium, including applying to the surface for a period of from 1 to 10 seconds at a temperature of from 150° F to 200° F a composition *having a pH in the range 1.15 to 0.85,* consisting of [an aqueous solution wherein the pH of the solution is in the range 1.15 to 0.85,] *demineralised water, wherein* chromium ion is present in the amount of 5 to 15 grams per liter, *chromium being the only metallic ion present,* perchlorate ion is present in the amount [of 0.5 to 0.85 grams] *corresponding to from 0.3 to 0.5 ml of 60 percent perchloric acid* per liter, and fluoride ion is present in the amount [of 0.1 to 0.27 grams] *corresponding to from 0.1 to 0.25 ml of 48 percent hydrofluoric acid* per liter.

13. A process for producing a conversion coating on a metal surface comprising zinc or cadmium, including applying to the surface for a period of from 1 to 10 seconds at a temperature of from 170° F to 190° F a composition *having a pH in the range 1.0 to 0.9* consisting of [an aqueous solution wherein the pH of the solution is in the range 1.0 to 0.9,] *demineralised water, wherein* chromium ion is present in the amount of 9 to 13 grams per liter, *chromium being the only metallic ion present,* perchlorate ion is present in the amount [of 0.5 to 0.85 grams] *corresponding to from 0.3 to 0.5 ml of 60 percent perchloric acid* per liter and fluoride ion is present in the amount [of 0.15 to 0.27 grams] *corresponding to from 0.15 to 0.25 ml of 48 percent hydrofluoric acid* per liter.

* * * * *